Jan. 30, 1923.

C. POSTRANECKY.

APPARATUS FOR GRINDING OR MIXING CACAO, CHOCOLATE, OR THE LIKE.

FILED JULY 7, 1914.

1,443,926.

Witnesses:

Inventor:
Carl Postranecky

Patented Jan. 30, 1923.

1,443,926

UNITED STATES PATENT OFFICE.

CARL POSTRANECKY, OF DRESDEN, GERMANY.

APPARATUS FOR GRINDING OR MIXING CACAO, CHOCOLATE, AND THE LIKE.

Application filed July 7, 1914. Serial No. 849,485.

*To all whom it may concern:*

Be it known that I, CARL POSTRANECKY, a subject of the King of Saxony, and resident of Dresden, Germany, have invented certain new and useful Improvements in Apparatus for Grinding or Mixing Cacao, Chocolate, and the like, of which the following is a specification.

Hitherto, apparatus for grinding or mixing materials have become known, in which stirring members are moved in circular or other fashion within a vessel having a straight or spherical bottom. It has also been proposed to construct said stirring member as a roll, which moves over a straight bottom in permanent direct contact with the latter.

The present invention has for its object to construct an apparatus of the type mentioned, having a vessel or trough with a spherical bottom and stirring members forming each two rolls on a common axle, said rolls being of symmetrical shape to the formation of said bottom in such a way that their whole rolling surfaces are in permanent direct contact with the latter, while their mounting is such that they perform three different stirring and rolling actions, whereby a thorough grinding or mixing of the material contained in said trough is obtained.

The annexed drawing shows two appropriate constructional forms of the subject matter of the invention;

Fig. 1 is a side view of the improved apparatus showing one form, while

The apparatus comprises a trough $a$ having a bottom of spherical shape, on which the rolling and stirring device is arranged. The latter comprises an upper frame $b$, which is keyed on a rotary power-driven shaft $c$. From said frame project inclined depending arms or axles $d$, preferably three, of which each is connected, in a way known in the art, with a planet-gearing, which causes a body arranged on the end of the arm to rotate.

Each of said bodies on the arms $d$ consists of two rolls $f$, which are revolubly mounted on a common transverse axle $e$ fixed to the end of the axle $d$ at right angles thereto.

Upon rotation of the shaft $c$, the arms $d$ together with the bodies thereon are set in circular rotation. Further, by means of the planet-gearing, each body is rotated on the axle $d$. Finally, each body is rotated on its own arm $e$. Thereby, the apparatus performs three different stirring and rolling actions, and the material is worked thereby in any direction and thus thoroughly mixed or ground.

Figure 1:
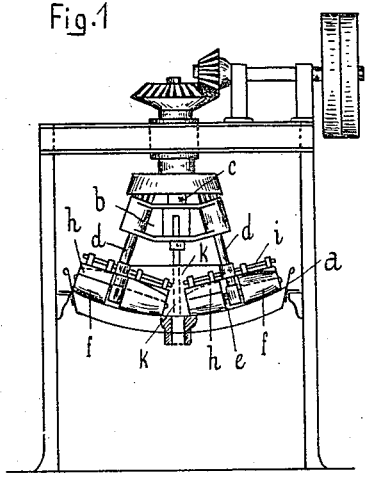
Figure 2:
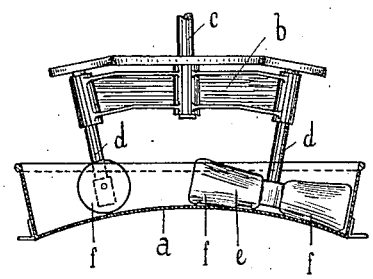
Fig. 2 is a side view of part of the apparatus, showing the other form.

In order to permit of the bodies performing their intended actions, they must be in permanent direct contact with the spherical bottom of the trough $a$, which is either convex as shown in Fig. 2, or concave as shown in Fig. 1, the position of the arms $d$ being in both modifications always perpendicular to the bottom of trough $a$, while the shape of the rolling bodies $f$ corresponds symmetrically to that of the bottom.

In a certain position of the rolls $f$ (see left-hand roll $f$ in Fig. 2), the rolls do not rotate for a certain time but they slide temporarily on the bottom of the trough $a$ only, so that their movement changes between rolling and sliding and their action between rolling, tearing and grinding of the material on said bottom, whereby the desired effect is further increased.

The inclined position of the arms $d$ has the advantage that always that roll, which runs the nearest to the edge of the bottom of the trough, acts to push the outwardly slid material again down or inwards. With arms assuming vertical position on a straight bottom, this particular effect could not be obtained, as in this case the rolls would always move on the bottom in such a way only that the material would be moved outwards toward the edge of the bottom without any possibility of its being again returned by action of the rolls.

The preferred form of construction is that shown in Fig. 2, as in this case the material cannot settle on the centre of the bottom of the trough but slides continuously down the declined sides of the bottom along the rolling bodies $f$, the manifold action of the latter being the same as above described.

As shown in Fig. 1, a rake $h$ in permanent contact with the upper part of the rolls may be provided and fixed on a transverse stay $i$ keyed to the axle $d$, whereby any material sticking to the rolling bodies is stripped-off. Furthermore, a shovel-like member $k$ depending from the frame $b$ may serve for conveying the material from the sides to the middle of the bottom.

What I claim, is:—

In an apparatus for grinding or mixing cacao, chocolate or the like, the combination with a stationary trough having a spherical bottom, of a rolling and stirring device arranged on said bottom and comprising a rotary power-driven shaft, an upper frame keyed on said shaft, inclined depending arms on said frame arranged perpendicular to said bottom, a planet-gearing in said frame with which each of said arms is connected, a transverse axle on the end of each arm, and a rotary body on each transverse axle consisting of two rolls, each roll being of symmetrical shape to the formation of said bottom and thus adapted to be with its whole rolling surface in permanent direct contact with the latter, substantially as and for the purpose set forth.

In testimony whereof I have hereunto set my hand in the presence of two subscribing witnesses.

CARL POSTRANECKY.

Witnesses:
 LEO BERGHOLZ,
 PAUL ARRAS.